Figure 1:
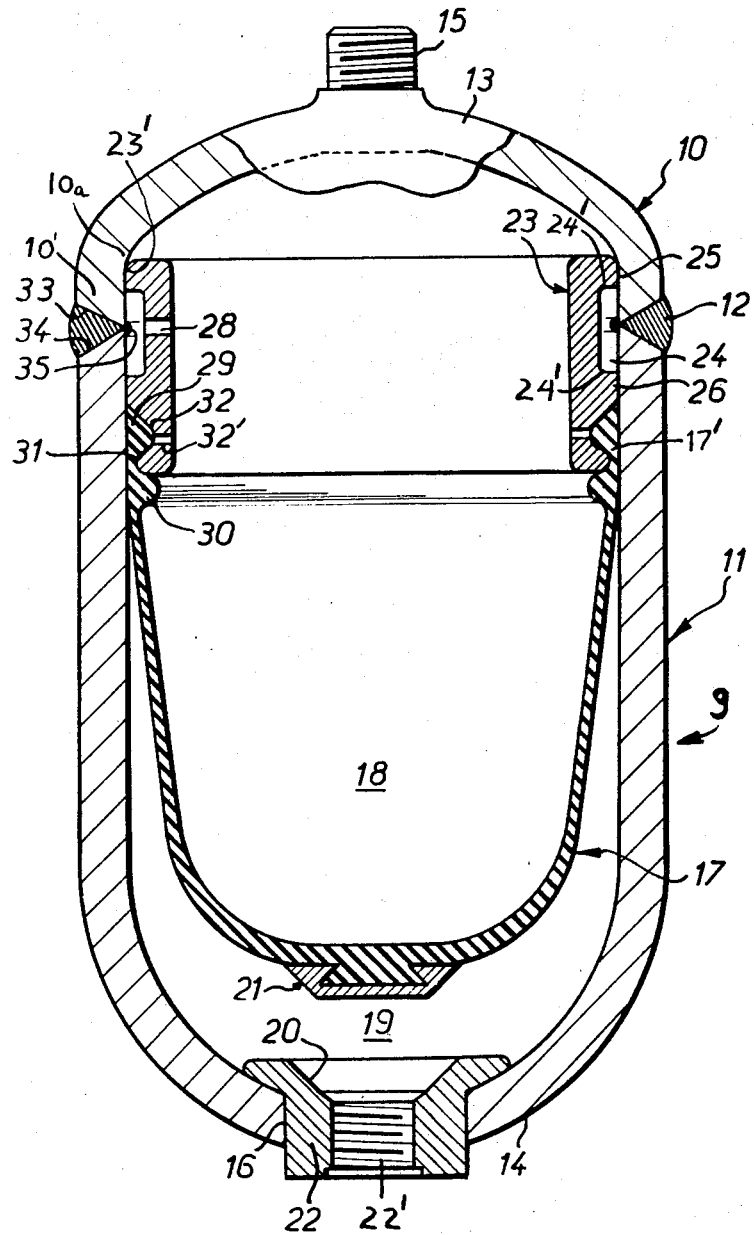

United States Patent

Mercier

[15] 3,674,054
[45] July 4, 1972

[54] PRESSURE VESSEL

[72] Inventor: Jacques H. Mercier, 49 rue de Naples, Paris, France

[22] Filed: Feb. 16, 1971

[21] Appl. No.: 115,254

[30] Foreign Application Priority Data

March 6, 1970 France ........................... 7008076

[52] U.S. Cl. .................................................... 138/30
[51] Int. Cl. .................................................. F16l 55/04
[58] Field of Search ................................... 138/26, 30

[56] References Cited

UNITED STATES PATENTS

| | | | |
|---|---|---|---|
| 3,137,317 | 6/1964 | Peters | 138/30 |
| 3,168,907 | 2/1965 | Mercier et al. | 138/30 |
| 3,195,576 | 7/1965 | Mercier | 138/30 |
| 3,397,719 | 8/1968 | Ortheil | 138/30 |

Primary Examiner—Herbert F. Ross
Attorney—Arthur B. Colvin

[57] ABSTRACT

The invention relates to a pressure vessel or container comprising two substantially cup-shaped shells having their free edges located in juxtaposition by means of an internal annular retainer member which properly spaces such free edges to permit connection thereof by a weld and which also serves as the support for a deformable partition positioned in the container.

10 Claims, 4 Drawing Figures

PRESSURE VESSEL

As conducive to an understanding of the invention, it is to be noted that when two cup-shaped shells have their edges in juxtaposition to be retained together by welding, it is important that the welding metal engage the entire thickness of the juxtaposed rims in order to provide a dependable bond.

It is also important that the two shells of the container be properly positioned with respect to each other at the time of the welding operation which is generally performed by rotating the juxtaposed shells in front of a welding device. Such positioning requires not only that the two shells be axially aligned but also that a slight axial clearance be provided between the rims of the shells so that the welding metal will completely fill the space to permit the metal to bond to the entire juxtaposed surfaces of such rims.

It is also essential that the deformable partition be securely retained inside the container formed after the welding operation, with no damage being imparted to the material of the partition as a result of the heat given off by the welding operation.

It is accordingly among the objects of the invention to provide a pressure vessel of the above type which has relatively few parts, which may readily be assembled in a minimum of time with assurance that the adjacent rims of the shells forming the pressure vessel be properly spaced and located to insure that a dependable bond will be formed and which will insure that a minimum of heat will be transmitted during the welding operation to the deformable partition positioned in the container and also that the region where the welding operation is performed will not be deformed by excessive heat which may cause improper retention of the deformable partition.

According to the invention, the pressure vessel comprises two substantially cup-shaped shells, the rims of which are properly located and retained in juxtaposition by means of an annular retainer member positioned in the container formed by the juxtaposed shells so that the container may be rotated and a dependable welding operation may be performed in the space between the rims of the shells. The annular retainer member has an annular cavity in its outer periphery facing the space between the juxtaposed rims, the retainer thus connecting the adjacent rims of the shells and furthermore the cavity providing for distribution of the heat resulting from the welding operation, the retainer having a bore therethrough providing communication between the cavity and the interior of the container to permit dissipation of the heat resulting from the welding operation.

Furthermore, the retainer member provides means whereby the deformable partition, preferably a bladder, may be mounted.

Figure 2:
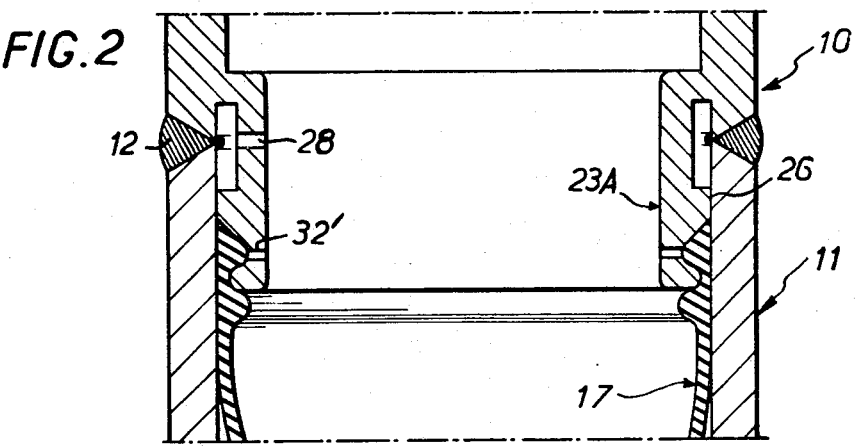
Figure 3:
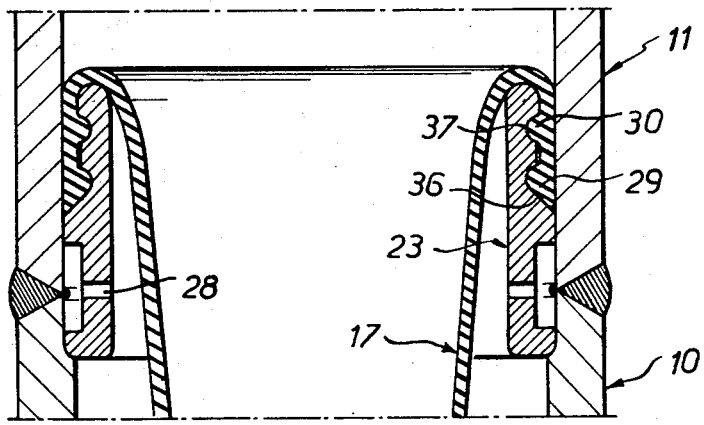
Figure 4:
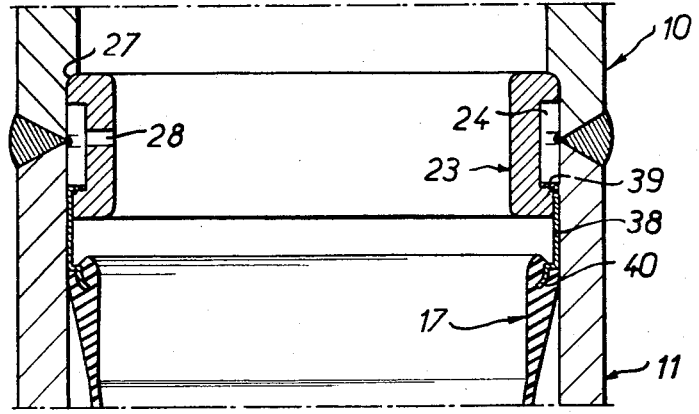

In the accompanying drawings in which are shown one or more of various possible embodiments of the several features of the invention;

FIG. 1 is a longitudinal cross section of a pressure vessel incorporating the invention herein, and FIGS. 2, 3 and 4 are fragmentary longitudinal embodiments of other embodiments of the invention.

Referring now to the drawings, the invention is incorporated in a pressure accumulator which, as shown in FIG. 1 comprises a container 9 of rigid metal capable of withstanding relatively high pressures.

The container comprises two complementary shells 10 and 11, the former comprising the cap or cover member for the latter, which defines the body portion of the accumulator. The rims 33 and 34 of the shells 10 and 11 are secured together by a weld joint 12. As shown in the drawings, the space between the rims 33, 34 is preferably triangular and is formed by beveling the rims 33, 34 with the inner edge 35 of said rims being in close proximity.

Each of the shells 10, 11 has a rounded end 13, 14 so that the accumulator is a substantially cylindrical unit having substantially hemispherical ends, each of which has a port 15, 16 therethrough which are axially aligned. The port 15 is adapted to receive a suitable gas valve (not shown) and the port 16 is adapted to receive a fitting 22.

As shown in FIG. 1, the fitting 22 comprises a cylindrical sleeve affixed as by welding in the port 22, the inner end of the sleeve having an annular flange which seats on the portion of shell 11 adjacent the periphery of port 16. The inner periphery 20 of sleeve 22 is beveled as shown to define a seat for a valve head 21.

Positioned in the container and particularly in shell 11 thereof is a deformable partition or separator 17 which may be of rubber or of material having like characteristics. The partition illustratively is a bladder having an enlarged mouth 17', said bladder dividing the container 9 into two chambers or compartments, i.e., a gas chamber 18 in connection with port 15 and an oil chamber 19 in connection with the passageway 22' in the sleeve 22.

The chamber 18 is adapted to be charged with a gas under pressure through a valve mounted in port 15 for example, and chamber 19 is adapted to receive a liquid such as oil through the passageway 22' in sleeve 22 which is adapted to be connected to the hydraulic system.

The passageway 22' in sleeve 22 is designed to be closed by the valve member 21 which, as shown in FIG. 1, may comprise a button of metal or the like secured to the closed end of bladder 17, the valve member having a periphery of configuration complementary to that of beveled seat 20.

The bladder 17 is retained in the container defined by shells 10, 11 by means of an annular retainer or ring member 23 which is located in transverse alignment with the weld joint 12.

The annular retainer 23 is of rigid material such as steel and has an annular cavity 24 in its outer surface which faces the weld joint 12 and more particularly the side walls 24' of the annular cavity 24 straddles the weld joint 12.

In the embodiment shown in FIG. 1, the retainer member 23 has on its outer surface two annular faces 25, 26 which straddle the cavity 24. The annular face 25 is designed to abut against the inner surface of shell 10 adjacent its rim 33 and the annular face 26 is designed to abut against the inner surface of shell 11 adjacent its rim 34. Thus, the retainer member 23 serves to connect the shells 10, 11 together.

More particularly, in the embodiment shown, in assembling the pressure accumulator before the weld joint 12 is formed, the annular retainer member 23 which has an outer diameter just slightly greater than that of the cylindrical portion 10' of shell 10 is forced into said cylindrical portion so that the annular face 25 will press tightly against the inner surface of the cylindrical portion 10'.

If desired, instead of a force fit between annular retainer member 23 and shell 10, the two parts can be spot welded together.

As shown in FIG. 1, one or more passageways 28 are formed in the retainer member 23 providing communication between cavity 24 and the chamber 18. Preferably the passageways 28 comprise one or more bores formed directly through the retainer member and in transverse alignment with weld joint 12.

In the embodiment shown in FIG. 1, the mouth 17' of bladder 17 on the inner surface thereof has two annular beads 29, 30 formed integral therewith and spaced from each other.

In order to support the bladder 17, the outer surface of the retainer member 23 has an annular groove 32 designed to receive the annular bead 29. In addition, the outer surface of the retainer member at its inner end is rounded to define an annular rib 31 of transverse width less than the thickness of the retainer member so that the end of rib 31 extends inwardly of the wall of the container to accommodate the material of the bladder between beads 29, 30.

As the beads 29, 30 are under tension due to the interposition of annular rib 31 therebetween and as the inner diameter of the mouth of the bladder is less than the outer diameter of the inner end of the retainer member, the mouth of the bladder would be securely retained on the member 23. Preferably, a bore 32' is provided in the inner end of the retainer member, providing communication between groove 32 and chamber 18 so as to subject the bead 29 to the gas pressure in chamber 18 to enhance the seal.

After the retainer member 23 is forced into the shell 10 as previously described, with the movement of the retainer 23 into the shell being limited by the abutment of the outer edge 23' of the retainer member against the rounded portion 10a of the shell 10, the bladder is then attached in the manner above described, to the free end of the retainer member 23 which protrudes outwardly from shell 10.

The shell 11 is then forced over the bladder 18 and the retainer member 23, until the rim 34 of shell 11 is in juxtaposition to the rim 33 of shell 10 with the inner edges 34 of the beveled rims 33, 34 being in close proximity to each other.

By reason of the retainer member 23, accurate positioning of the shells 10, 11 before welding is achieved with the shells precisely centered and with the bladder 17 dependably retained in position. Furthermore, the space defined between rims 33, 34 is exactly controlled with a minimum of clearance at the inner edge 35.

To perform the welding operation, the port 15 is left open and the container defined by the assembled shells 10, 11 is rotated about its axis in proximity to a welding station which deposits welding material in the space between the rims 33, 34 and which fills the slight clearance 35 so that the weld joint will completely encompass the entire thickness of the container wall.

By reason of the cavity 24, the heat created during the welding operation will be distributed uniformly over the entire associated wall surface of the container, avoiding any localized zone of over heating which could deform the container and interfere with the sealing action provided by the annular beads 29, 30.

In addition, the bores 28 permit a portion of the heat created during the welding operation to pass into the chamber 18 and then discharge through the open port 15 so that the temperature rise is minimized thereby preventing injury to the bladder 17 and the container.

As soon as the welding action has been completed and after the container has cooled, it is a relatively simple matter to verify that the weld joint has properly encompassed the entire thickness of the container wall.

This may readily be accomplished by the use of suitable optical instruments which can be inserted through the port 15 and permit inspection of the weld joint at 35 through the bores 28. Thereupon, a gas valve (not shown) is inserted in port 15 to complete the assembly.

In operation of the pressure accumulator above described, the sleeve 22 is connected to the hydraulic system and gas under pressure is forced through the valve in port 15 to precharge the bladder 17 so that it expands to engage the inner surface of the container, the valve 21 moving on seat 20 to prevent extrusion of the bladder 17.

Thereupon, a valve (not shown) interposed between sleeve 22 and the hydraulic system is opened to permit flow of oil under pressure through sleeve 22 into the compartment 19 to charge the accumulator and compress the bladder 17 and the gas in chamber 18.

When the pressure in the hydraulic system is less than that in the accumulator, the compressed bladder will expand so that the oil in chamber 19 will be forced out of sleeve 22.

The embodiment shown in FIG. 2 is similar to the embodiment of FIG. 1 except that the retainer member 23A is formed integral with shall 10.

In the embodiment of FIG. 3 the retainer member 23 is also similar to the retainer member of FIG. 1 except that it has two annular grooves 36, 37 therein to accommodate two annular beads 29, 30 formed in the mouth of the bladder.

In addition, as shown in FIG. 3, the shells 10 and 11 are reversed as far as FIG. 1 is concerned. Thus, the retainer member 23 is first forced into the shell 10 and the mouth of the bladder is secured to the upper end thereof and thereupon the shell 11 is moved on the retainer member. As a result, the bladder 17 hangs downwardly into the shell 10.

In the embodiment of FIG. 4, the bladder 17 has its mouth bonded as at 40 to an annular supporting member 38 which extends upwardly from said mouth. The annular supporting member is retained in position by the annular member 23 as at 39. The annular member 23 is located in shell 10 by abutment against annular shoulder 27.

The annular members 23, above described, thus function as a retainer for the bladder 17; as a junction or connector for the shells 10, 11, as a distributor for the heat evolved during the welding operation and it affords means through the bores 28 to inspect the weld joint.

Having thus described my invention, what I claim as new and desire to secure by Letters Patent of the United States is:

1. A pressure vessel of the type comprising a metal container, said container comprising two substantially cup-shaped shells having the rims of the mouth portions thereof of substantially the same diameter, an annular retainer member positioned in said container with at least a portion of the outer periphery of said retainer with at least a portion of the outer periphery of said retainer member against the inner surface of said two shells adjacent the rims thereof and retaining said rims in juxtaposition to each other and defining a space therebetween, said retainer member having an annular cavity in its outer periphery in transverse alignment with the space between the rims of said shells, weld means sealing the surface between said juxtaposed rims to bond said rims together, said annular retainer member having a transverse bore extending therethrough and aligned with the space between the juxtaposed rims of said shells and with said weld, said bore providing communication between said annular cavity and the interior of said container, a deformable partition mounted on said retainer member and dividing the interior of said container into two chambers, each of said shells having a port in communication with an associated chamber.

2. The combination set forth in claim 1 in which said annular supporting member is of outer diameter just slightly larger than the inner diameter of one of said shells so that it may fit therein by force fit with a portion of said annular retainer member remote from said first portion extending into the other shell.

3. The combination set forth in claim 1 in which said annular retainer member has a portion thereof positioned in one of said shells, means to secure said portion of said annular retainer member in said shell, said annular retainer member has the portion thereof remote from said secured portion extending into the other of said shells.

4. The combination set forth in claim 1 in which said juxtaposed rims are beveled to define a triangular space therebetween in cross section, the apex of said triangular space being at the exterior of the container.

5. The combination set forth in claim 4 in which the apex of said triangular space defines an annular opening exposed in said annular cavity and said retainer member has a transverse bore extending therethrough and in alignment with said annular space, said transverse bore providing communication between said annular cavity and the interior of said container.

6. The combination set forth in claim 1 in which the portion of the outer periphery of said annular retainer member on each side of said annular cavity defines an annular face, the outer diameter of one of said annular faces being slightly greater than the inner diameter of one of said shells so that it may fit therein by force fit, the portion of said annular retainer member on its outer periphery between the other annular face and the adjacent edge of the retainer member having an annular groove therein, the thickness of the edge portion of said retainer member being less than the thickness of the retainer member to define clearance between the outer periphery of said edge portion and the inner surface of the adjacent portion of said other shell and said deformable partition has a mouth having an inwardly extending bead adapted to seat in said annular groove in said retainer member with the portion of said partition adjacent said bead extending through the space defined between said rim and the inner wall surface of said container.

7. The combination set forth in claim 6 in which said deformable partition has an additional annular bead spaced from said first annular bead and adapted to be positioned inwardly of said annular rim.

8. The combination set forth in claim 1 in which said annular retainer member has one edge thereof formed integral with one of said shells adjacent the rim thereof, said annular retainer member extending outwardly beyond said rim of said shell, said retainer member having a portion of the outer periphery thereof extending outwardly from said first shell defining an annular face, said annular cavity in the outer periphery of said retainer member straddling said juxtaposed rims, the portion of said other shell adjacent the rim thereof encompassing said annular face with said rims being in juxtaposition and being spaced from each other, the portion of said annular retainer member in said other shell having an annular groove in its outer periphery with the adjacent edge of said retainer member being of thickness slightly less than the thickness of said annular face to define clearance between said rim and the adjacent inner surface of said shell, said deformable partition having an annular bead at its mouth positioned in said annular groove with the adjacent portion of said partition extending through the space between said rim and the adjacent surface of said container.

9. The combination set forth in claim 1 in which said annular retainer member has a pair of annular faces adjacent one edge thereof defining said annular cavity therebetween, the portion of said annular retainer member adjacent the other edge thereof having a pair of spaced annular grooves in its outer periphery, said first edge portion of said annular retainer member being positioned in one of said shells with the annular face adjacent said edge portion being secured in said shell, and with the portion of said annular retaining member including the other annular face extending outwardly from said first shell, said second shell encompassing said other annular face and the remaining portion of said retainer member, with the rims of said shells in juxtaposition and spaced from each other and aligned with said annular cavity, the other rim of said retainer positioned in said other shell being of thickness less than the thickness of said other annular face to define clearance between said other rim and the adjacent wall of said other shell, said deformable partition having a pair of spaced annular beads at its mouth positioned respectively in said annular grooves with the portion of said partition extending outwardly of said beads being bent around said other edge of said retainer member and then extending downwardly through said annular retainer member.

10. The combination set forth in claim 1 in which said annular retainer member has a pair of annular faces in its outer periphery defining the annular cavity therebetween, one of said annular faces being secured in one of said shells and the other annular face extending into the other of said shells, said juxtaposed rims being aligned with said annular cavity, said deformable partition having a thickened rim with an annular supporting member having an inwardly extending flange at its free end adapted to be positioned in said annular cavity with the adjacent portion of said annular supporting member extending between said annular face in said other shell and the adjacent wall surface of said container.

\* \* \* \* \*